July 18, 1950     B. F. GRAVELY     2,515,343
POWER OPERATED SICKLE MOWER

Filed June 21, 1948     4 Sheets-Sheet 1

Benjamin F. Gravely
INVENTOR.

BY

July 18, 1950  B. F. GRAVELY  2,515,343
POWER OPERATED SICKLE MOWER
Filed June 21, 1948  4 Sheets-Sheet 2
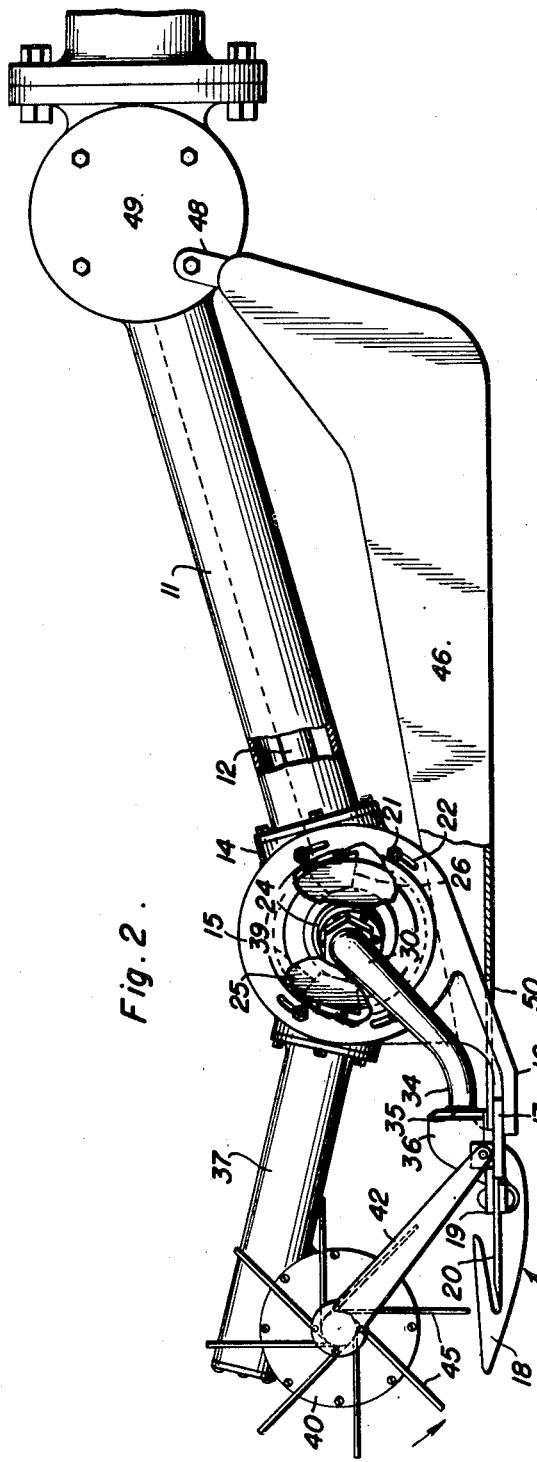
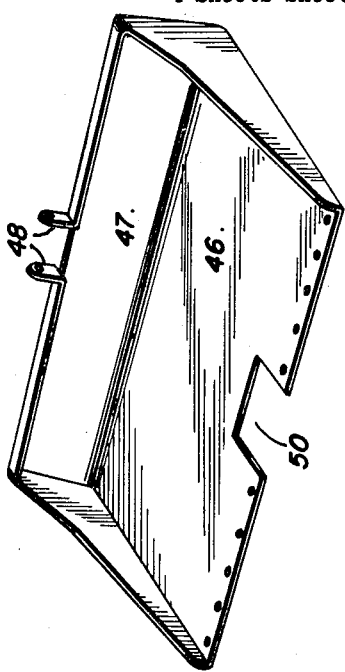
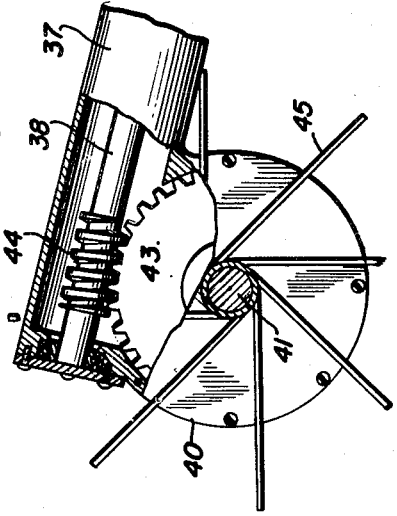
Benjamin F. Gravely
INVENTOR.
BY
Attorneys July 18, 1950     B. F. GRAVELY     2,515,343
POWER OPERATED SICKLE MOWER Filed June 21, 1948     4 Sheets-Sheet 3

Benjamin F. Gravely
INVENTOR.

July 18, 1950
B. F. GRAVELY
2,515,343
POWER OPERATED SICKLE MOWER
Filed June 21, 1948
4 Sheets-Sheet 4
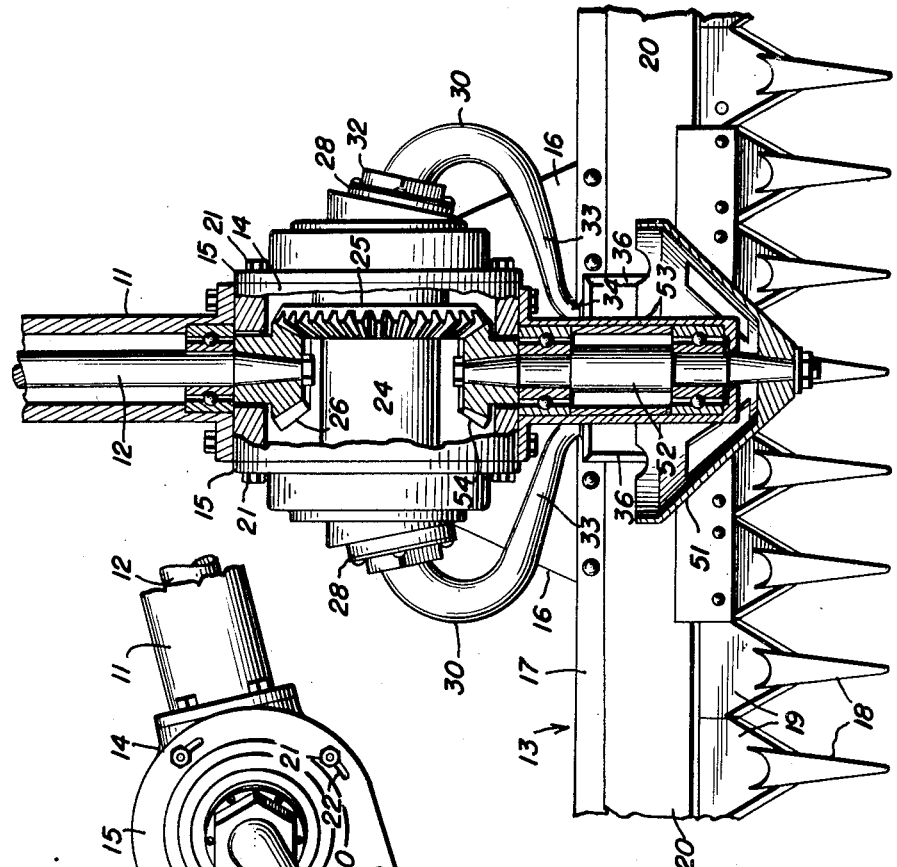
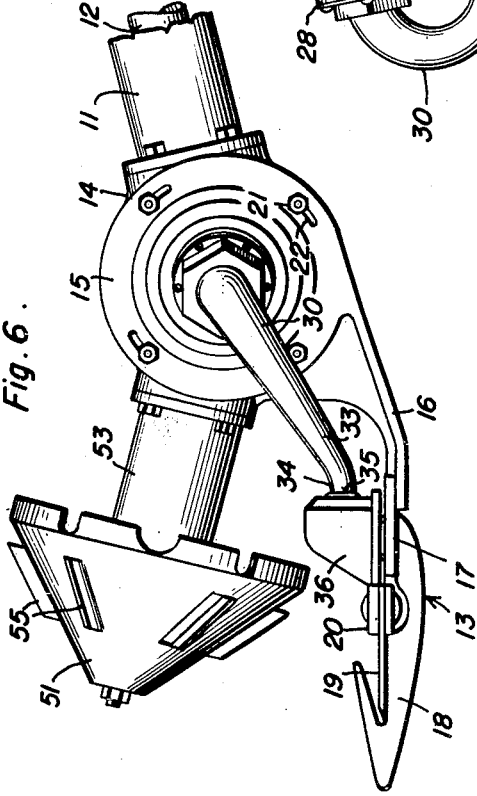
Benjamin F. Gravely
INVENTOR.

Patented July 18, 1950

2,515,343

UNITED STATES PATENT OFFICE 2,515,343

POWER-OPERATED SICKLE MOWER

Benjamin F. Gravely, Nitro, W. Va., assignor to B. F. Gravely and Sons Manufacturing Company, Nitro, W. Va., a corporation of West Virginia Application June 21, 1948, Serial No. 34,199

4 Claims. (Cl. 56—26.5)

This invention relates to improvements in mowing machines of the type generally disclosed in my prior U. S. Patent No. 1,876,662, dated September 13, 1932, wherein a power unit is mounted upon a pair of coaxial supporting wheels and carries and drives front cutting mechanism of the reciprocating sickle bar type, the power unit having rearwardly projecting handles by means of which the machine is steered by a walking attendant.

An important object of the present invention is to provide a cutting mechanism embodying a pair of reciprocable sickle bars disposed in end to end relation, and simple and efficient means to reciprocate said sickle bars so that they are alternately moved toward and away from each other.

Another object is to provide a rotary clearer at the central portion of the cutting mechanism to throw cut vegetation laterally and prevent it from lodging between and clogging the sickle bars.

A further object is to provide a novel construction by means of which the cutting mechanism may be vertically adjusted.

Still another object is to provide rotary reels for throwing the cut vegetation rearwardly from the cutting mechanism into a collection pan, and novel means for driving said reels.

The exact nature of the present invention, as well as other objects and features thereof, will become apparent from the following description when considered in connection with the accompanying drawings, in which:

Figure 2 is an enlarged fragmentary side elevational view of the forward portion of the machine shown in Figure 1, partly broken away and in section;

Figure 4 is a fragmentary detail view, partly in side elevation and partly in section, showing the rotary reels and the driving means therefor;

Figure 5 is a perspective view of the vegetation collection pan;

Figure 6 is a view somewhat similar to Figure 2, showing a modification;

Figure 7 is a view somewhat similar to Figure 3 of the construction shown in Figure 6.

Figure 1:
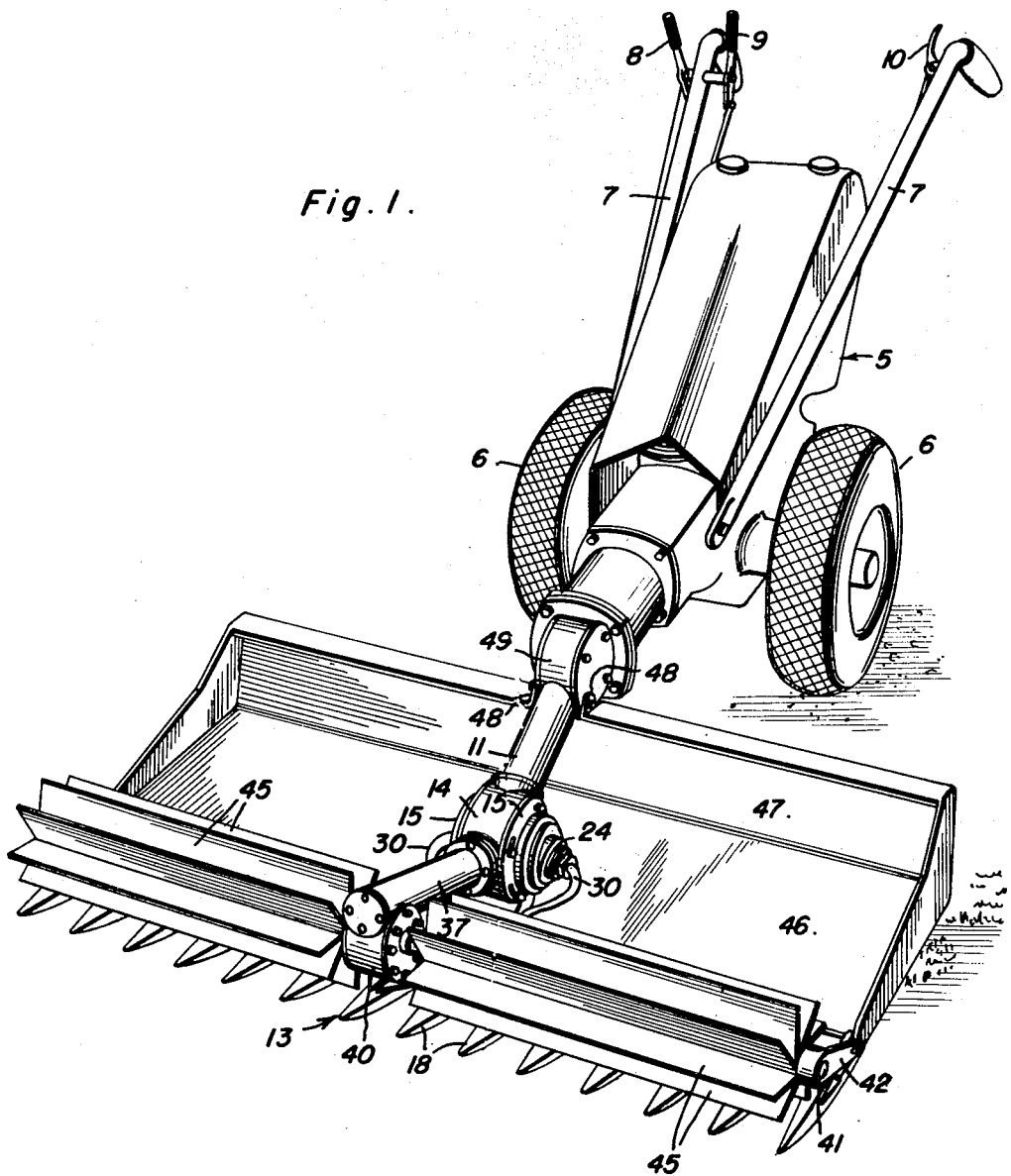
Figure 1 is a perspective view of a mowing machine embodying the present invention.

Referring in detail to the drawings, 5 indicates a conventional housed power unit of the type which includes an internal combustion engine, a fuel tank, etc. The power unit is mounted on coaxial supporting wheels 6 which may be driven by the engine, and rearwardly projecting handles 7 are provided on the sides of said unit so that the machine may be steered by a walking attendant. Various devices 8, 9 and 10 are located on the handles for conveniently controlling the engine, etc. Projecting and inclining forwardly from the power unit is a rigid tubular housing 11 for a longitudinal drive shaft 12 driven by the engine and operatively connected to cutting mechanism 13 of the reciprocating sickle bar type.

In accordance with the present invention, the body of a circular gear casing 14 is attached to the front end of housing 11 and is provided with rotatably adjustable side closure plates 15 having forwardly extending bottom brackets 16 rigid therewith on which is secured the fixed cutter bar 17 of the cutting mechanism 13. The cutter bar has the usual guard fingers 18 for the blades 19 of a pair of reciprocable sickle bars 20 which are disposed in end to end relation upon the cutter bar. Thus, by adjusting the plates 15, the cutting mechanism 13 may be swung and thereby adjusted vertically to proper relation to the ground, according to the tilted position of the power unit as governed by the height of the attendant, etc. The plates 15 may be secured to the body of casing 14 by bolts 21 passing through arcuate slots 22 of said plates and screwed into said casing body, the latter being bolted to the housing 11. Journalled in bearings 23 carried by the plates 15 and projecting centrally through the latter is a transverse driven shaft 24 having keyed thereon a bevel gear 25 which measures with a bevel pinion 26 secured on the forward end of drive shaft 12. The shaft 24 is of relatively large diameter and has oblique cylindrical sockets 27 in the opposite ends thereof. Screwed into these sockets are flanged bushings 28 in which are journalled straight cylindrical rear end portions 29 of substantially U-shaped drive arms 30. Bolts 31 are screwed into the inner ends of the end portions 29 with their heads engaged behind the inner flanged ends of bushings 28 to hold said end portions 29 in said bushings without resisting turning of said end portions 29 in said bushings. Grease retainers 32 are provided on the end portions 29 and secured to the flanged outer ends of bushings 28. The forward end portions 33 of arms 30 have forwardly directed extensions 34 which are provided with ball terminals 35 engaged in socket assemblies 36 secured on the adjacent ends of the sickle bars 20, for providing universal joints between the drive arms 30 and said sickle bars. The arrangement is such that when the shaft 24 is driven, the arms 30 are moved angularly to reciprocate the ball terminals 35 transversely of the machine and to thereby reciprocate the sickle bars to alternately move the latter toward and away from each other.

Figure 3:
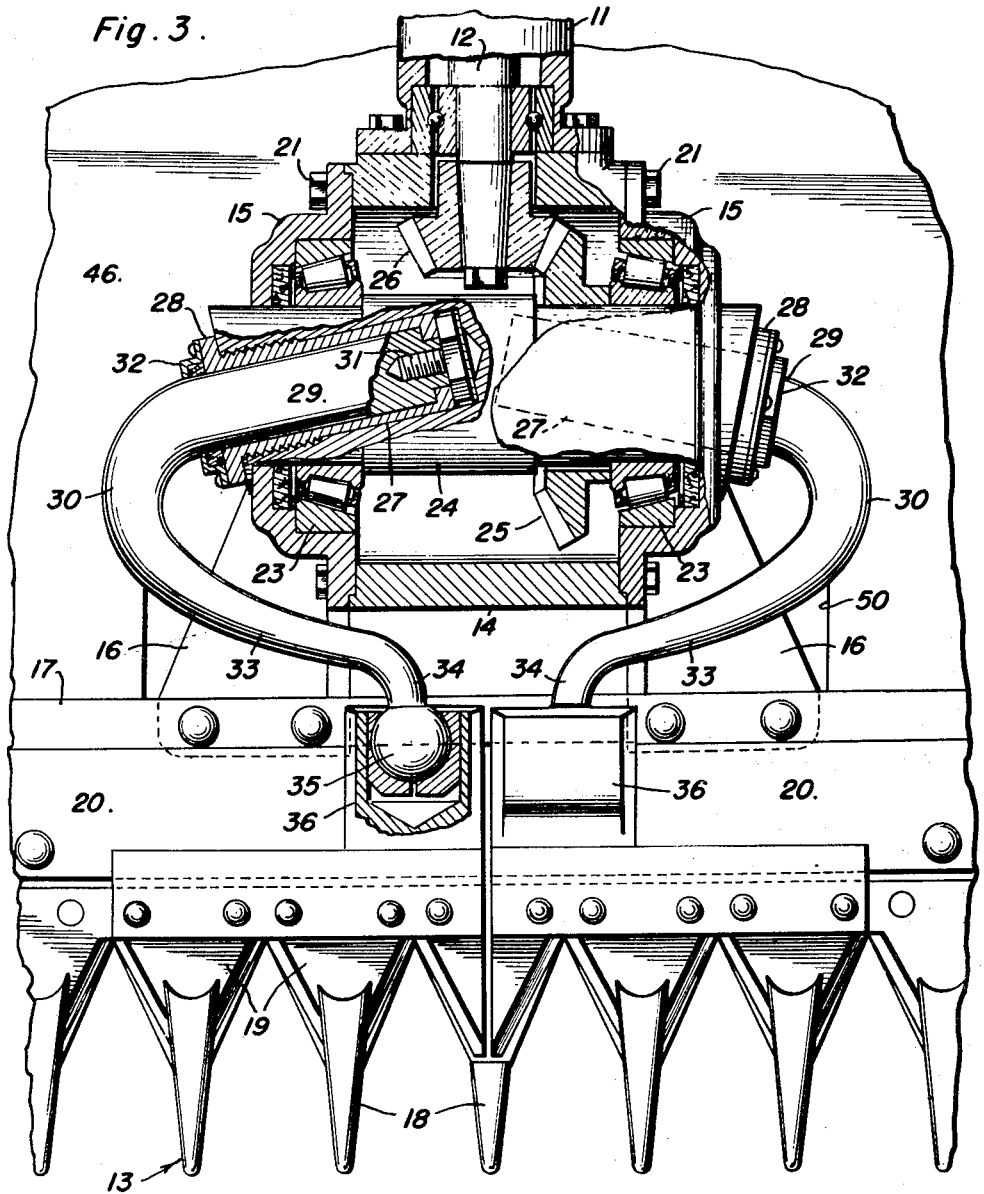
Figure 3 is an enlarged fragmentary view, partly in top plan and partly in section, showing the means to reciprocate the sickle bars.

In the embodiment of Figures 1 to 5 inclusive, a forwardly and upwardly extending shaft housing 37 is bolted to the front of the body of casing 14 and has a shaft 38 journalled therein, which shaft has a bevel pinion 39 secured on its rear end in mesh with the gear 25. At its forward end, the housing 37 carries a depending casing 40 through which extends a transverse horizontal shaft 41 of a length to extend to the ends of the cutting mechanism 13 where its ends are journalled in bearing brackets 42 attached to the ends of the cutter bar 17. Shaft 41 has a worm wheel 43 secured thereon within casing 40, and a worm 44 secured on the forward portion of shaft 38 meshes with this worm wheel. Reels including paddles 45 are disposed over the cutting mechanism 13 and are secured on the portions of shaft 41 at opposite sides of casing 40. These reels are driven by the gearing 43 and 44 to throw the cut vegetation rearwardly into a collection pan 46. The pan 46 has a back member 47 provided with ears 48 bolted to opposite sides of a casing 49 on the rear end of housing 11. The front of pan 46 rests on and is secured to the cutter bar 17, and said pan is centrally recessed at 50 to clear the brackets 16 so as to not interfere with the vertical adjustment of the cutting mechanism.

In the embodiment of Figures 6 and 7, the pan 46 and the reels are dispensed with, and a conical rotary clearer 51 is provided over the central portion of the cutting mechanism to deflect standing vegetation laterally to be cut and to then throw the cut vegetation laterally and prevent it from lodging between and clogging the sickle bars. The clearer 51 is secured on the projecting front end of a shaft 52 journalled in a housing 53 which is bolted to and extends forwardly and upwardly from the body of casing 14. A pinion 54 is secured on the rear end of shaft 52 and meshes with the gear 25. Clearer 51 consists of a hollow metallic cone apertured at its apex to receive the tapered front end of shaft 52, and it has radial vanes 55 struck outwardly therefrom. Obviously, when the shaft 24 is driven to reciprocate the sickle bars, the clearer 51 will also be driven by the gearing 25, 54.

From the foregoing description, it is believed that the construction, operation and advantages of the present invention will be readily understood and appreciated by those skilled in the art. As the general type of mowing machine and its mode of use and operation are well known, it appears unnecessary to discuss the same more in detail herein. Further modifications and changes in detail of construction are contemplated within the spirit and scope of the invention as claimed.

Having described the invention, what is claimed as new is:

1. In a power driven mower having a power unit supported by a pair of wheels and having a cutting mechanism supported forward of said wheels including a stationary transverse cutter bar and a pair of reciprocable sickle bars aligned end to end with each other and associated with said stationary cutter bar, a drive mechanism for said sickle bars comprising in combination, a longitudinal rotary drive shaft driven by said power unit, a transverse driven rotary shaft geared to said drive shaft, a driving member pivotally engaging one end of said transverse driven shaft and connected to one of said reciprocable sickle bars, a second driving member pivotally engaging the other end of said driven shaft and connected to the other of said reciprocable sickle bars, said pivotal engagement of said driving members with said transverse shaft being on axes at an angle to the axis of rotation of said transverse shaft, said driving members having portions thereof reciprocable on a transverse axis parallel to and spaced from the axis of said transverse driven shaft, whereby said aligned sickle bars are simultaneously reciprocated in opposite directions along said stationary cutter bar.

2. In a power driven mower having a power unit supported by a pair of wheels and having a cutting mechanism supported forward of said wheels including a stationary transverse cutter bar and a pair of reciprocable sickle bars aligned end to end with each other and associated with said stationary cutter bar, a drive mechanism for said sickle bars comprising in combination, a langitudinal rotary drive shaft driven by said power unit, a transverse driven rotary shaft geared to said drive shaft, said transverse driven rotary shaft having a recess in each end thereof with the axis of each recess being oblique to the rotary axis of said transverse shaft, a driving member having a portion seated in one of said recesses and having another portion connected to one of said reciprocable sickle bars, a second driving member having a portion seated in the other of said recesses and having another portion connected to the other of said reciprocable sickle bars, whereby said aligned sickle bars are simultaneously reciprocated in opposite directions along said stationary cutter bar.

3. In a power driven mower having a power unit supported by a pair of wheels and having a cutting mechanism supported forward of said wheels including a stationary transverse cutter bar and a pair of reciprocable sickle bars aligned end to end with each other and associated with said stationary cutter bar, a drive mechanism for said sickle bars comprising in combination, a longitudinal rotary drive shaft driven by said power unit, a transverse driven rotary shaft geared to said drive shaft, said transverse driven rotary shaft having a recess in each end thereof with the axis of each recess being oblique to the rotary axis of said transverse shaft, a U-shaped driving member having one end secured in one of said recesses for rotation with respect to said transverse shaft and having the other end pivotally secured to one of said reciprocable sickle bars, a second U-shaped driving member having one end secured in the other of said recesses for rotation with respect to said transverse shaft and having the other end pivotally secured to the other of said reciprocable sickle bars, whereby said aligned sickle bars are simultaneously reciprocated in opposite directions along said stationary cutter bar.

4. In a power driven mower having a power unit supported by a pair of wheels and having a cutting mechanism supported forward of said wheels including a stationary transverse cutter bar and a reciprocable sickle bar associated with said stationary cutter bar, a drive mechanism for said sickle bar comprising in combination, a longitudinal rotary drive shaft adapted to be driven by said power unit, a transverse driven rotary shaft geared to said drive shaft, and a driving member pivotally engaging one end of said transverse driven shaft and adapted to be connected to said reciprocable sickle bar, said pivotal engagement of said driving member with said transverse shaft being on an axis at an angle to the axis of rotation of said transverse shaft, said driving member having a portion thereof reciprocable on a transverse axis parallel to and spaced from the axis of said transverse driven shaft, whereby said sickle bar is reciprocated along said stationary cutter bar by rotation of said longitudinal drive shaft.

BENJAMIN F. GRAVELY.

REFERENCES CITED

The following references are of record in the file of this patent:

UNITED STATES PATENTS

| Number | Name | Date |
|---|---|---|
| 858,947 | Brown | July 2, 1907 |
| 961,995 | Yocum | June 21, 1910 |
| 1,351,939 | Andre | Sept. 7, 1920 |
| 1,876,662 | Gravely | Sept. 13, 1932 |
| 1,888,210 | Moir | Nov. 22, 1932 |
| 2,190,161 | Moyer | Feb. 13, 1940 |
| 2,258,517 | Rose | Oct. 7, 1941 |
| 2,424,660 | Howard | July 29, 1947 |

FOREIGN PATENTS

| Number | Country | Date |
|---|---|---|
| 36,593 | Switzerland | Mar. 10, 1906 |